United States Patent [19]

Weetman

[11] Patent Number: 4,468,130

[45] Date of Patent: Aug. 28, 1984

[54] MIXING APPARATUS

[75] Inventor: Ronald J. Weetman, Rochester, N.Y.

[73] Assignee: General Signal Corp., Rochester, N.Y.

[21] Appl. No.: 318,170

[22] Filed: Nov. 4, 1981

[51] Int. Cl.³ .............................................. B01F 7/20
[52] U.S. Cl. .................................. 366/330; 416/243; 416/DIG. 5
[58] Field of Search ............... 366/241, 245, 247, 249, 366/279, 325, 327, 329, 330; 416/143, 193 R, 223 R, 236 A, 242, 243, DIG. 3, DIG. 5

[56] References Cited

U.S. PATENT DOCUMENTS

| D. 226,823 | 5/1973 | Landberg | D15/138 |
|---|---|---|---|
| 330,941 | 12/1860 | Ward | 416/193 |
| 1,506,937 | 9/1924 | Miller | 416/242 |
| 2,581,873 | 1/1952 | Morrison | 416/242 |
| 3,512,762 | 5/1970 | Umbricht | 261/87 |
| 4,054,272 | 10/1977 | Cooke | 366/330 |
| 4,063,852 | 12/1977 | O'Connor | 416/223 R |
| 4,120,609 | 10/1978 | Chou et al. | 416/223 R |
| 4,123,198 | 10/1978 | Harbord | 416/223 R |
| 4,147,437 | 4/1979 | Jonqueres | 416/223 R |
| 4,329,115 | 5/1982 | Kreff | 416/236 A |

FOREIGN PATENT DOCUMENTS 1454277  11/1976  United Kingdom ............... 416/223

OTHER PUBLICATIONS

"Lightnin Areators" Mixing Equipment Co. Inc. 1978.
Weetman & Salzman "Input of Side Flow on Mixing Impeller" Chem. Eng. Progress, pp. 71-75, 6/1981.

Primary Examiner—Philip R. Coe
Assistant Examiner—Arthur D. Dahlberg
Attorney, Agent, or Firm—Martin LuKacher; J. S. Mednick

[57] ABSTRACT

The mixing of liquid and liquid suspensions in vessels is obtained by a mixing impeller mounted on a shaft and rotated by a drive which delivers selected speed and torque. The torque and power needed to obtain given flow is minimized by a low-cost impeller having a plurality of blades, each formed from a plate of constant thickness except for a leading edge of rounded profile. Each blade has camber which decreases from the tip to the base thereof. The base can be flat to facilitate the attachment of the blades to the shaft. The blades are oriented and twisted to be at the threshold for flow separation along the width of the blades from the leading to the trailing edge thereof, thereby providing maximum flow in the axial direction before the onset of flow separation. The orientation and twist of the blades provides a generally constant angle of attack along the entire blade from tip to base and the planform of the blade provides for uniform loading, stability and minimization of fluid forces which tend to bend the shaft.

23 Claims, 12 Drawing Figures

MIXING APPARATUS

DESCRIPTION

The present invention relates to mixing apparatus and particularly to apparatus for the mixing of liquids and liquid suspensions of solids and gases contained in vessels.

The invention is especially suitable for use in mixing equipment for chemical processes. It may be used to provide mixers for solid suspensions, emulsifiers, and aerators, as well as in other mixing operations.

Advanced mixing equipment has utilized double surfaced, cambered airfoil impellers to provide substantially axial flow throughout the mixing vessel at high efficiency (maximization of Q/P, where Q is the axial flow in gallons per minute and P is energy in horsepower). Such high efficiency airfoil impellers are made from a formed upper and lower skin. They are made up of sections of variable thickness and must be fabricated using an internal framework and outer skin. Such double surfaced cambered airfoil impellers tend to be expensive. Low cost impellers have been fabricated from plates, and curved plates with camber and twist have been used as impellers. Such impellers are made to operate with low angle of attack by the selection of twist and camber in order to make the flow they produce more axial (see U.S. Pat. No. 4,147,437, issued Apr. 3, 1979). Such curved plate airfoil impellers sacrifice total flow and efficiency in order to obtain an axial flow pattern.

The design of mixing apparatus and particularly impellers for use in a mixing vessel is extremely difficult because of the complex fluid flows which affect the flow pattern, torque and power requirements to obtain the desired flow pattern (preferably axial) throughout the vessel for effective mixing and solids suspension. The problems are exacerbated when efficient production of axial flow, minimum torque and fluid forces, which adversely affect the mixer drive and stability of the impeller during mixing operations, are desired. It is particularly desirable to have efficient axial flow over long distances, for example, 2 to 4 impeller diameters in length, so that the impeller can be located close to the top of the tank, thereby allowing the use of shorter shafts which reduce the effect of fluid forces on the mixer drive and increase the critical speed of the apparatus so as to enable it to run faster and deliver power to the mixing process at lower torque.

It has been discovered and verified by actual tests using a laser velocimeter that the foregoing problems can be obviated with an impeller formed from a cambered plate having a profile and orientation with respect to the flow vector in the liquid which control separation or stalling. A flow pattern which is axial over long distances may be obtained. The impeller blades may be uniformly loaded to maximize the flow before the onset of separation. Inasmuch as separation is avoided, efficiency is enhanced, thereby enabling energy conservation in mixing operations. Further information respecting the use of laser velocimeters may be obtained from the following article: R. J. Weetman and R. N. Salzman, Chemical Engineering Progress, June 1981, page 71.

Accordingly, it is an object of the present invention to provide improved mixing apparatus.

It is a further object of the present invention to provide improved mixing apparatus having an improved impeller which approaches the pumping efficiency (Q/P), torque and total flow of a double surfaced cambered airfoil impeller with a curved plate airfoil, thereby enabling the impeller and its drive to be manufactured at much lower cost than is the case for double surfaced cambered airfoil impellers.

It is a still further object of the invention to provide an improved mixer impeller having higher efficiency and requiring lower drive torque than flat bladed or plate impellers which have heretofore been available.

It is a still further object of the present invention to provide an improved mixing impeller which produces a flow pattern in the mixing tank which is substantially more axial than flat bladed impellers which have heretofore been provided.

It is a still further object of the present invention to provide an improved mixing impeller which permits the location thereof well above the bottom of the mixing vessel while providing flow and suspension of solids reaching to the bottom of the tank, thereby avoiding long overhung shafts and critical speed problems associated with such long shafts.

It is a still further object of the present invention to provide an improved mixing impeller which can be formed from a solid plate of uniform thickness and which reduces fluid forces transverse to its rotating shaft, thereby permitting the use of smaller diameter shafts and reducing the cost of the drive system by eliminating the need for bearings and supports designed to operate under high transverse forces.

Briefly described, improved apparatus for mixing liquids or liquid suspensions in a vessel in accordance with the invention has an impeller with a plurality of blades which are rotatable about an axis. Each of the blades is a curved plate airfoil having a leading edge with a rounded profile. The blades are oriented to define geometric pitch angles at the threshold of separation along the blades, thereby maximizing the flow in the direction of the axis of rotation of the impeller, with uniform loading and reduction in fluid forces.

The foregoing and other objects, features and advantages of the invention, as well as presently preferred embodiments thereof, will become more apparent from a reading of the following description in connection with the accompanying drawings in which:

Figure 1:
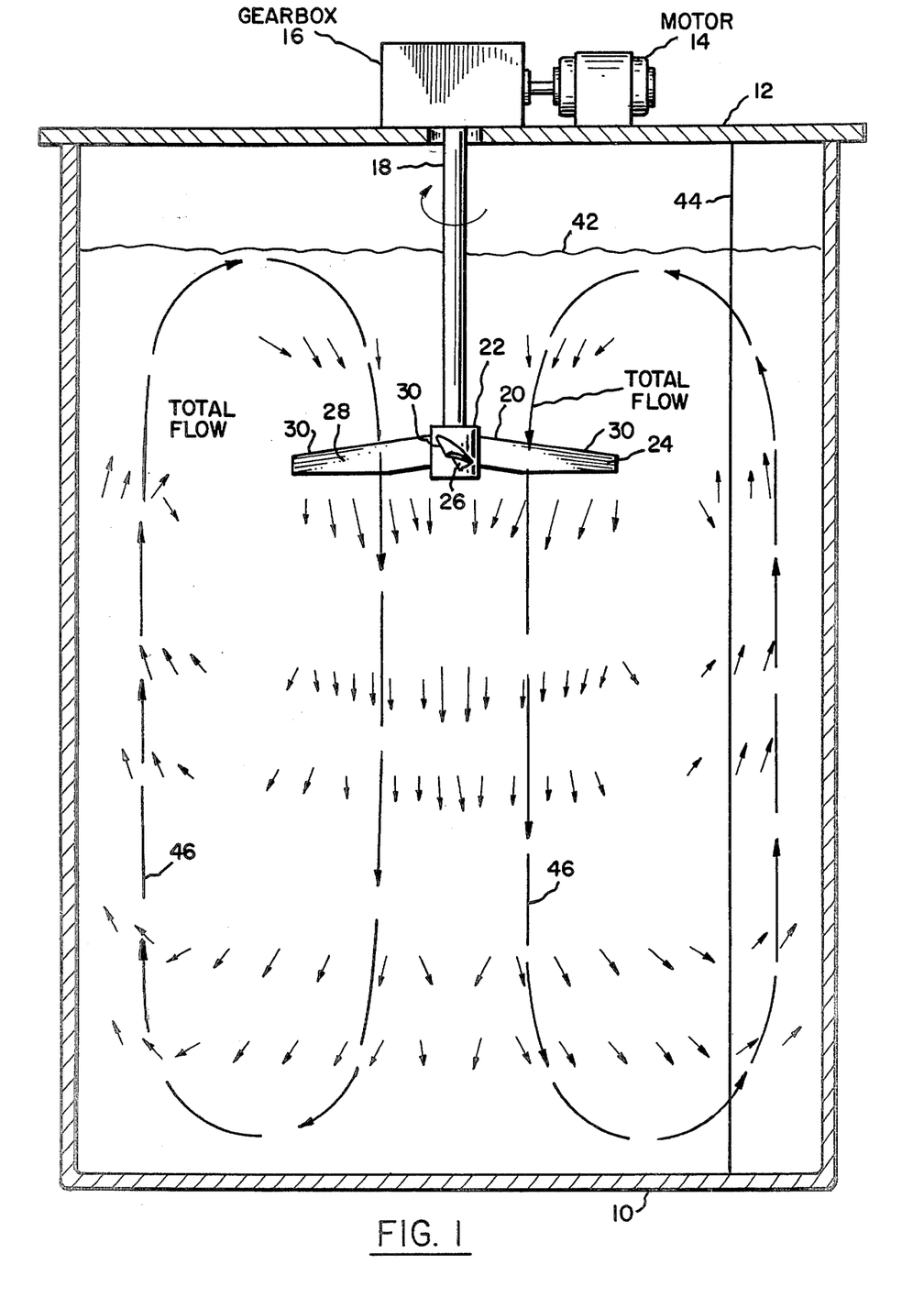
FIG. 1 is a sectional view, in elevation, taken through a mixing tank embodying mixing apparatus according to the invention and showing the flow pattern obtained in the tank.

Referring more particularly to the drawings, FIG. 1 shows a mixing vessel in the form of a cylindrical tank 10. A beam 12 across the top of the tank supports a motor 14 and a gear box 16. The shaft 18 on which a mixing impeller 20 is attached is supported by the gear box 16. The bearings in the gear box 16, which may be of convention design, support the shaft 18 as well as rotate the shaft and the impeller 20. The shaft, gear box and motor constitute the drive for the impeller. The impeller 20 is mounted on a hub 22 and consists of three blades 24, 26 and 28, one hundred twenty degrees apart.

Each blade is identical in shape and orientation on the hub 22. The blades are formed from plates and are of constant thickness except at their leading edge 30 which is of rounded profile. The blades are airfoils and have camber and twist.

Figures 5, 6:
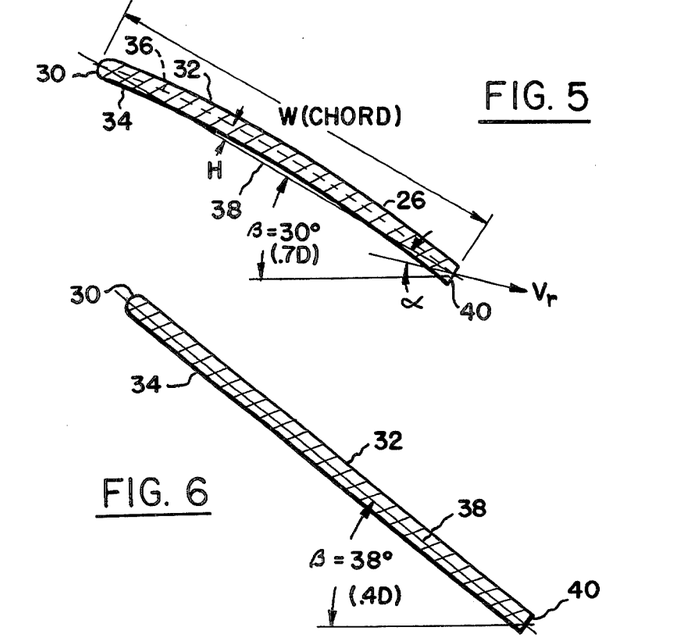
FIG. 5 is a sectional view taken along the plane perpendicular to a diameter of the impeller shaft at 0.7 D, where D is the diameter circumscribed by the leading edge of the impeller tip as it rotates, this section also being indicated by the line 5—5 in FIG. 3.
FIG. 6 is a sectional view of the impeller taken at 0.4 D, the section also being shown by the line 6—6 in FIG. 3.

The terms used herein to define the airfoil and its orientation will be more apparent from FIG. 5 which is a section to a typical one of the blades 26 of the impeller 20. The plate of which the blade is constructed has a thickness between its upper and lower surfaces 32 and 34. The dash line 36 through the middle of the section which bisects the section as it follows its profile is the mean-line. The chord 38 is the straight line of length W between the ends of the mean-line at the leading edge 30 and trailing edge 40. The camber is the ratio of the maximum distance, H, between the chord 38 and the mean-line 36, to the length W of the chord. Camber is expressed as a percentage. Thickness is also expressed as a percentage equal to the ratio of the thickness to the chord length. The blade is curved and has a somewhat elliptical shape in the preferred form thereof. The drawing shows the blade curved along an arc of a circle. The camber is therefore measured at the middle of the chord line 38. The angle, beta, between the chord line 38 and a horizontal line which is in a plane perpendicular to the axis of the shaft 18 is the geometric pitch angle. The angle, alpha, is the angle between the chord and the vector $V_r$ of the flow of the liquid past the blade. The angle, alpha, is the angle of attack.

In FIG. 1, the liquid fills the tank to the level shown by the wavy line 42. The tank may be equipped with one or more vanes or baffles 44 which extend radially from the walls of the tank. The principal direction of the flow is axial; that is, in the direction of the axis of the shaft 18 which is the axis of rotation of the impeller 20. Flow is pumped downwardly in the direction of the vectors which, by their length, indicate the velocity magnitude of the flow, and by their direction, the direction of the flow. The loops 46 show the direction of the total flow in the tank, which is axially downward in the direction of pumping by the impeller 20 and then upward along the wall of the tank. The upward flow is constrained somewhat by the baffle 44. The principal axial component of the flow is obtained due to the action of the impeller 20. In the mixing apparatus shown in FIG. 1, the tank diameter T is approximately three times the diameter of the impeller. The diameter of the impeller is defined as the diameter of the circle encompassed by the outer edge of the tip of the blades. This is the D/T ratio. A ratio of ⅓ is typical for mixing apparatus. The ratio used does not substantially affect the flow pattern inasmuch as the impeller pumps the fluid in a substantially axial direction. Downward pumping is shown, inasmuch as such is typical in solids suspension mixing apparatus. Upward pumping may be obtained by inverting the impeller 20 and rotating it in the opposite direction. In such case, the impeller would be located closer to the bottom of the tank.

It is a feature of the invention that the impeller, for the typical downward pumping application, may be located near the top of the tank, a distance, C, from the bottom or floor of the tank for approximately two to four impeller diameters D above the bottom of the tank. The C/D ratio may be from somewhat below 2 (e.g., 1.67) to above 4. Of course, the impeller may be used near the bottom of the tank, if necessary or desired for the process involved (e.g. at C/D of 0.2). Nevertheless, the impeller is allowed to be located well above the floor of the tank. This C/D ratio is much higher than with conventional flat bladed impellers, where the ratio is typically (0.2 to 1). Thorough mixing and solids suspension for the same input power may therefore be obtained with impellers located much closer to the top of the tank. Such shorter shafts are more preferred than long overhung shafts which, because of their mass and length, have lower critical speeds (the speed at which vibration of the shaft is amplified due to resonance). Mixing apparatus according to the invention can therefore be driven at greater speeds. Since horsepower is a function of the product of torque and speed, lower torque may be used, thereby simplifying the design and lowering the cost of the drive, for example, by requiring smaller, less expensive gears in the gear box 16 thereof.

It will be observed from FIG. 1 that the blades 24, 26 and 28 of the impeller 20 are curved plates having an airfoil profile with camber, varying pitch angle, beta and a swept back planform. The profile will be more apparent from FIGS. 3, 4, 5, 6 and 8. Because of the complexity of the hydrodynamic events in the mixing vessels (the tank 10), the distribution of pitch angle beta, camber, thickness, loading (the forces acting on the blades which translate into net fluid forces on the shaft and affect the stability of the impeller as well as the profile of the leading edge 30) and the total planform of the impeller are all significant, some to a lesser degree, in determining the flow pattern, torque and efficiency characteristics of the mixing apparatus.

Most significant, although interrelated with the other attributes of the shape of the impeller blades, are those attributes which determine separation or stalling. Flow separation occurs where the liquid fails to adhere to the blade. The flow direction may change upon separation, even to a direction opposite the direction of rotation of the impeller, which causes drag. The torque, fluid forces on the shaft and the efficiency of the mixing apparatus are enhanced in accordance with the invention by operating the impeller at the threshold for flow separation from the surfaces 32 and 34 of the blade, which is at the onset of separation or stalling for maximum axial flow.

The principal attributes of the shape of the blades are the rounded profile of the leading edge 30 and the orientation of the blades at the maximum geometric pitch angle (before separation or stalling) along the blade from the base or hub end 48 to the tip 50 thereof. The rounded profile of the leading edge 30 may be accomplished by forming the edge 30 with a radius equal to half the thickness, i.e., a semicircular cross-section as shown. A smaller radius, for example, one-third of the thickness on each corner of the leading edge 30, may be used. The rounded profile eliminates leading edge separation and enables the blade to be maintained at higher geometric pitch angles. The latter is desirable, since flow increases with increasing pitch angle beta, thereby enhancing the efficiency of the mixing apparatus. The pitch angle is increased until the onset of separation. This is where separation occurs backwards or downstream along the surfaces 32 and 34 from the leading edge 30.

Figure 4:
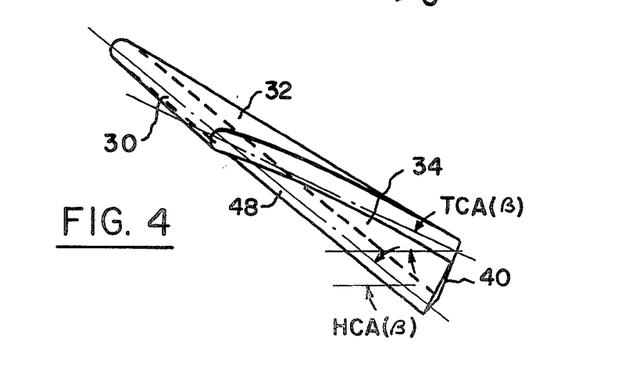
FIG. 4 is an end view of the blade shown in FIG. 3 looking toward the tip thereof.
Figure 7:
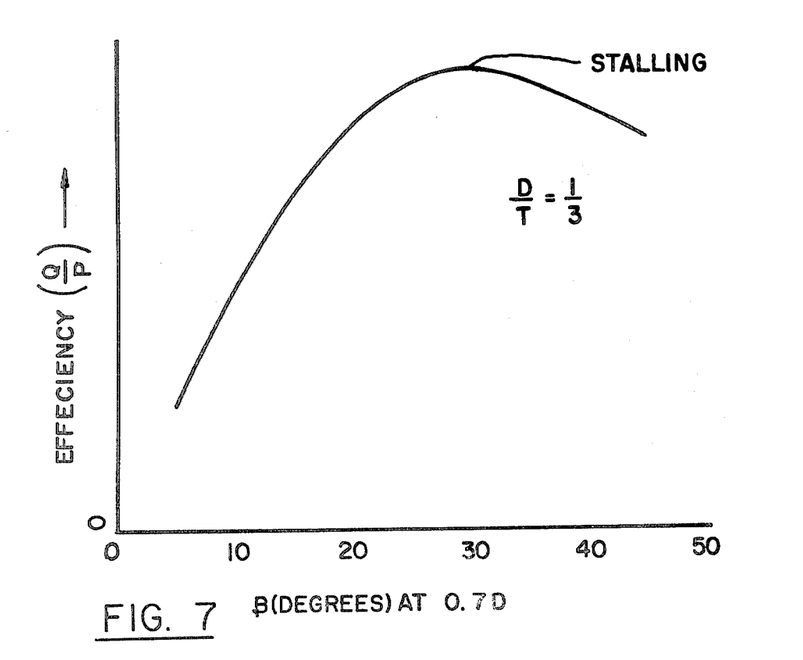
FIG. 7 is the curve showing the relationship between efficiency and geometric pitch angle, beta, at 0.7 D along the impeller.

As shown in FIG. 7, the geometric pitch angle and efficiency, which may be flow Q for given horsepower P, increases to a maximum at the onset of separation or stalling. The separation or stalling begins at approximately a pitch angle beta of 30° at the 0.7 D section of the blade, for a blade of approximately sixteen inch diameter. The pitch angle for separation is a function of the speed of the blade, the viscosity of the liquid (Reynolds number) and other factors. For the separation that generally starts near the trailing edge on the suction side of the blade, the angle of attack is the most important function. This angle of attack is kept relatively constant by adding twist and increasing the geometric pitch angle from the tip of the hub. This is off-set by the Reynolds Number based on the chord or width dimension on the impeller blade. Since the Reynolds Number is based mainly on the rotation velocity, wr, the Reynolds Number is greatest at the tip. With a higher Reynolds Number at the tip, this aids in prolonging the point of separation because of the increased turbulent energy in the stream going over the tip of the blade. The vortex of the tip of the blade causes an additional strain on keeping the flow attached on the upper surface of the blade. Also for structural and for loading reasons, it is advantageous to decrease the width of the tip which in effect lowers the Reynolds Number at the tip. This works in the opposite direction of the increase in speed and these effects tend to balance out each other. As discussed more fully hereinafter, another positive influence which increases the stability of the tip is the increased camber at the tip. In addition to this increased camber at the tip, the percent of blade thickness is also increased which also aids in stability. All of these factors which aid in stability are balanced in order to give as high a flow as possible before separation initiates. This also gives lower fluid forces. Accordingly, the geometric pitch angle at the threshold of separation tends to be lower near the tip 50 and higher near the base 48. This is accomplished by twisting the blades so that the tip chord angle (TCA), which is the geometric pitch angle, beta, at the tip, is less than the hub chord angle (HCA), which is the geometric pitch angle beta at the base. These angles and the twist of the blade are shown in FIG. 4. In a sixteen inch impeller operable in a liquid medium which is principally water, the tip chord angle is in the range from 12° to 32° and increases, generally linearly, along the diameter which extends through the blade to an HCA approximately 16° greater than the TCA. These pitch angles provide for approximately constant angle of attack alpha along the length of the blade from tip to base thereof so as to minimize diffential velocities along the blade length and accompanying shear effects, thereby maximizing efficiency.

For a sixteen inch blade designed to operate in a water medium, the geometric pitch angle, beta, at the tip 50 or TCA may be about 22°. Beta at 0.7 D as shown in FIG. 6 is about 30° and the geometric pitch angle at the hub or HCA is approximately 38°. Inasmuch as the region 52 (see FIG. 3 and FIG. 8) adjacent the base of the blade which is from the 0.4 D point along a diameter to the shaft axis is flat and without camber (0° camber), the pitch angle beta is equal to the HCA. For a sixteen inch impeller designed to operate in a water medium, this pitch angle may be 38°.

The efficiency and stability of the impeller as well as its ability to operate at high pitch angles for increased flow is also affected by the camber and by the thickness of the blade. The camber decreases in an inward direction and is greatest at the tip while decreasing to zero in the base region 52. The camber is expressed as the ratio of the camber distance H (between the chord 38 and the mean-line 36 [see FIG. 5]) and the length W of the chord as a percentage. In a blade in accordance with the invention, the camber may vary from approximately 8% at the tip to 0% in the base region. The variation may be generally linear from the tip 50 to the base region 52. Both the camber and the thickness of the blade enhance the pumping efficiency (Q/P), in that they enable the blade to be operated at higher pitch angle without flow separation. Preferably a relatively thick plate of about 8% is used. This thickness may be measured in the section at the 0.7 D diameter although it is constant due to the constant thickness of the plate which forms the impeller blade throughout its entire width and length except at the leading edge. A range of thickness of 6% to 10% may be suitable. The camber variation is preferably such that the camber is approximately 6% in the 0.7 D section. A range of 4% to 8% at 0.7 D may be suitable. The thickness of the blade, the variation in camber and in pitch angle (beta) provides for stability in operation as well as reduction in fluid forces. Fluid forces are the hydrodynamic forces on the impeller which translate into composite forces perpendicular to the shaft axis which tends to bend the shaft. The fluid forces are reduced by the uniform loading of the hydrodynamic forces on the blades due to the camber, thickness and pitch angle variation as mentioned above.

Figure 8:
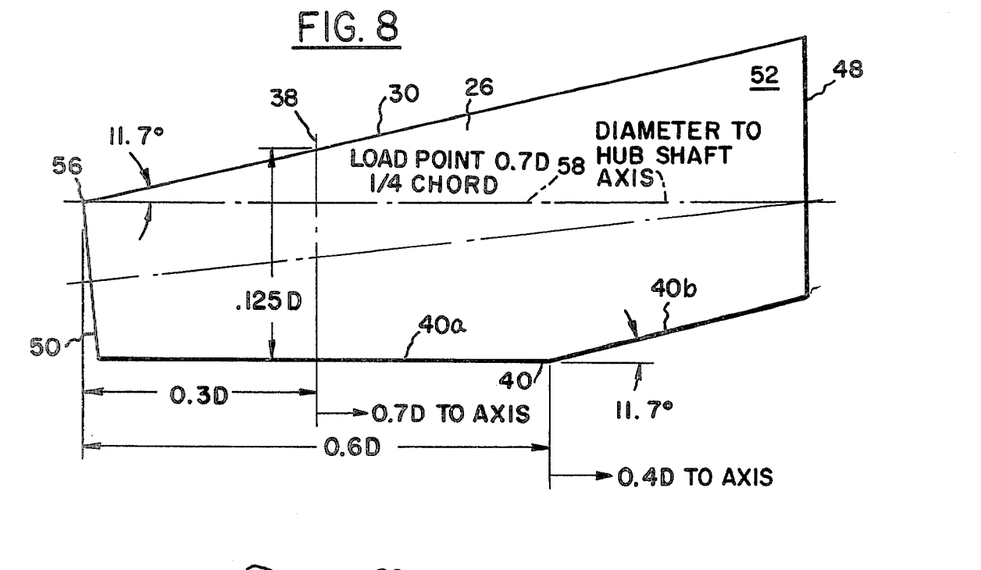
FIG. 8 is a view of the planform of a blade of the impeller which is illustrated in FIGS. 1 through 6.

The fluid forces are also reduced by virtue of the planform or shape of the outline of the blade which is best shown in FIG. 8. The planform is the blade before it is twisted or curved to provide the camber and pitch angle thereof. It will be observed from both FIG. 3 and FIG. 8 that the blade is of rectilinear form and has five sides. These sides are the leading edge 30, the tip 50, the base 48, and the trailing edge sides 40a and 40b. 40a is generally horizontal, and is in a plane perpendicular to the shaft axis. The portion 40b is in the flat section 52 and is swept inwardly towards the leading edge 30. Inasmuch as the outer trailing edge portion 40a is horizontal, it will leave the liquid all at the same time. This tends to reduce fluid forces, since there may be waves at the surface of the liquid, particularly while the liquid is being drained from the tank. Such waves can produce unbalanced hydrodynamic forces on the blades which result in high fluid forces on the shaft.

As shown in FIG. 8, the blade is attached to the shaft, usually via a hub 22 (see FIGS. 1 and 2) such that the leading edge and tip intersection 56 is along a diameter 58 to the axis of the hub and shaft (as is the axis of rotation of the impeller). The leading edge 30 is swept back so that the load point where the center of forces occurs on the blade 26 is at the intersection of the diameter 58 and the blade section at 0.7 D from the axis. This section is represented by the chord line 38 in the planform shown in FIG. 8. At the 0.7 D section, half of the forces applied by the impeller (half of the effective area of the impeller) is in the 0.3 D length thereof between the tip 50 and the 0.7 D section. The remaining 50% of the forces on the impeller are on the inner part thereof between the 0.7 D section and the hub. The sweep of the leading edge provides the load point at one-quarter of the length of the chord from the leading edge. The angle of the leading edge to the diameter is approximately 11.7°. The trailing edge portion 40b is also parallel to the leading edge. This construction provides for ease of manufacture as well as minimization of the twisting moments on the blade. The equalization of loading reduces the fluid forces as well. The tip 50 of the blade is slightly swept back to maintain constant radius. The decreasing camber, even for constant curvature of the blade, is obtained because the chord length increases over approximately 0.6 D length of the blade, up to the flat section 52, as shown in FIG. 8. This simplifies manufacture of the impeller blades from plate stock having the same curvature.

Draft tubes may be used with the impeller if desired. For solids suspension applications, the location of the impeller well above the floor of the tank will usually enable the impeller to start, since solids in the liquid which settle and impede starting are usually well below the level of the impeller.

Figure 2:
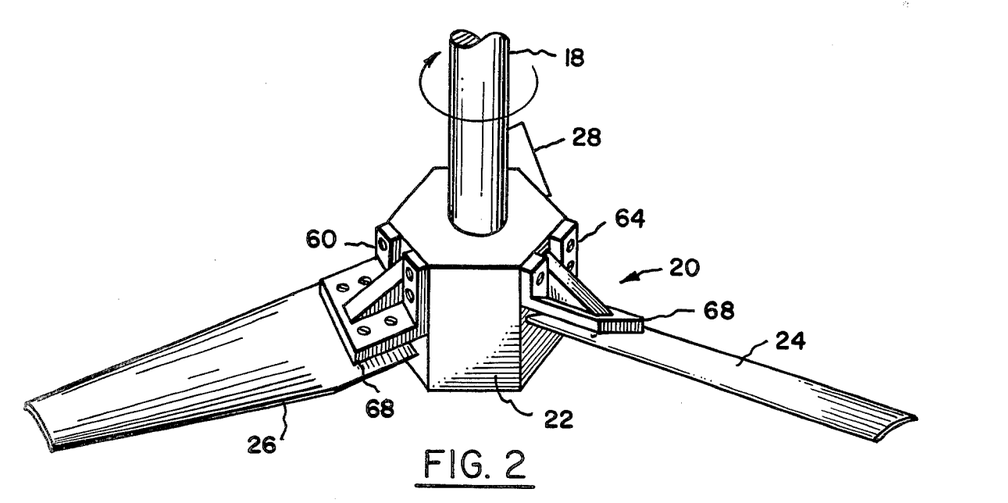
FIG. 2 is a perspective view of a mixing impeller embodying the invention.
Figure 3:
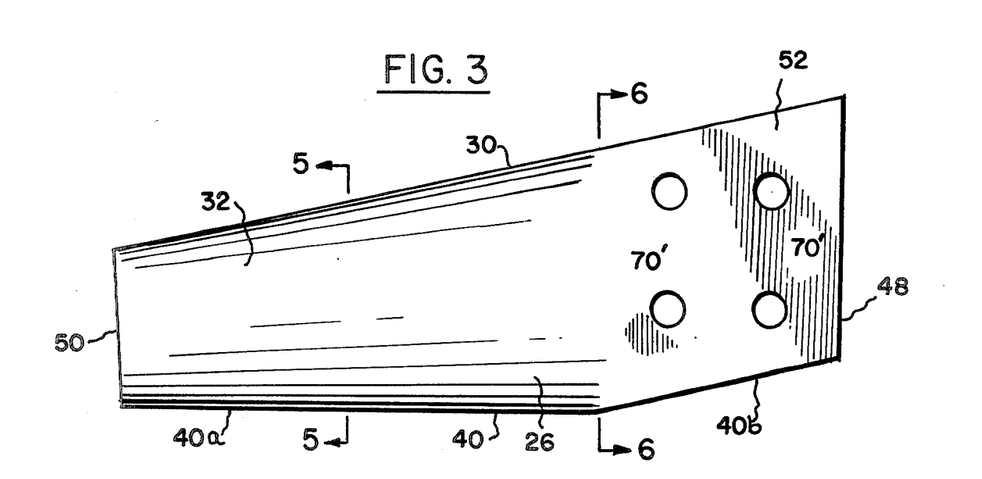
FIG. 3 is a plan view of one of the blades of the mixing impeller shown in FIG. 2.

The flat section 52 also facilitates the assembly of the blades on the hub 22 as shown in FIG. 2. The hub 22 may be hexagonal. Brackets 64, 66 and another bracket (not shown) mount the blades 24, 26 and 28, respectively, to the hub 22. Each of these brackets may be similar. They are generally L-shaped and have ears 68 which are oriented at the desired pitch angle (HCA) for the base of the impeller blades. The ears 68 are flat and have holes for fasteners such as screw bolts (not shown) which can go through complimentary holes 70 (see FIG. 3) in the flat section 52. Variation of pitch angle may be accomplished by providing for brackets with different angles for their ears 68. Accordingly, a family of impellers, with different variation in pitch angle, may be provided so as to be matched and optimized to the liquid or liquid suspension which is to be mixed. Unseparated flow at high efficiencies may be obtained, thereby reducing liquid shear effects which can result in erosion of the blade surfaces, particularly when abrasive solids are suspended in the liquid.

Hubs may also be fabricated with ears or made from castings for blade attachment. Also, an alignment notch or shoulder can be made on an investment cast hub to facilitate attachment in proper alignment onto the hub.

Figure 9:
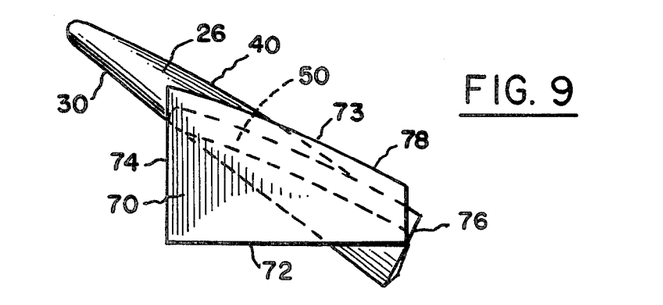
FIG. 9 is an end view of one of the blades of the impeller illustrated in FIGS. 1 through 6 and 8, showing a stabilizer fin attached to the tip thereof.
Figure 10:
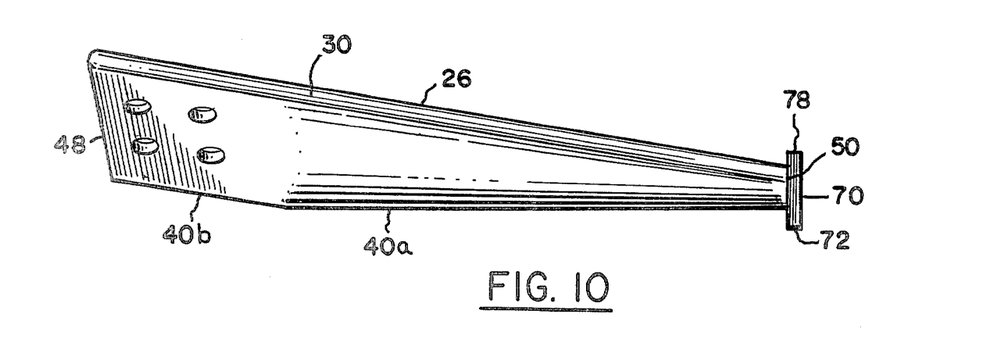
FIG. 10 is an front view of the blade shown in FIG. 9.

Referring to FIG. 9 and to FIG. 10, there is shown the blade 26 with a stabilizer fin 70 attached to the tip 50 thereof. The fin 70 is rectilinear along its bottom edge 72 and along its leading and trailing edges 74 and 76. The upper edge 78 follows approximately the profile of the cambered tip 50. The bottom edge 72 may be slightly below the outer trailing edge portion 48 of the blade. The upper edge 78 may be slightly above the tip 50 of the blade. It is a feature of this tip stabilizer fin that it collaborates with the blade profile and need not extend far above or below the blade to obtain stabilizing effect.

Figure 11:
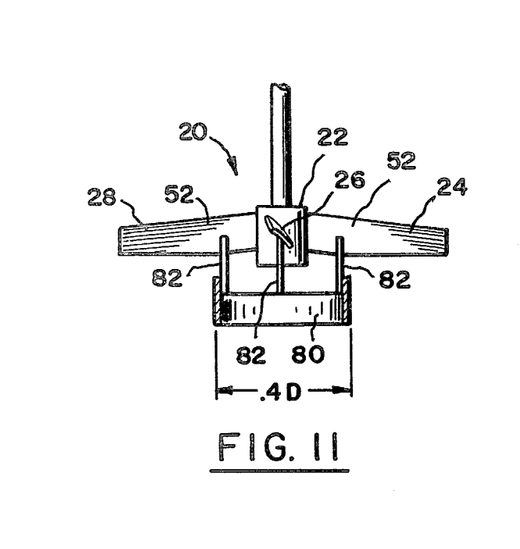
FIG. 11 is a view, in elevation, of a mixer impeller of the type shown in FIGS. 1 through 6 and 8 equipped with a cylindrical stabilizer tube.

Another stabilizer is shown in FIG. 11. A cylindrical tube 80 is attached by legs 82 to the flat section 52 of each of the blades 24, 26 and 28. The diameter of the tube 40 is equal to 0.4 D and it is co-axial with the shaft 18. Accordingly, the tube 80 provides for stabilizing the flow without interfering with the pumping action of the impeller 20.

Figure 12:
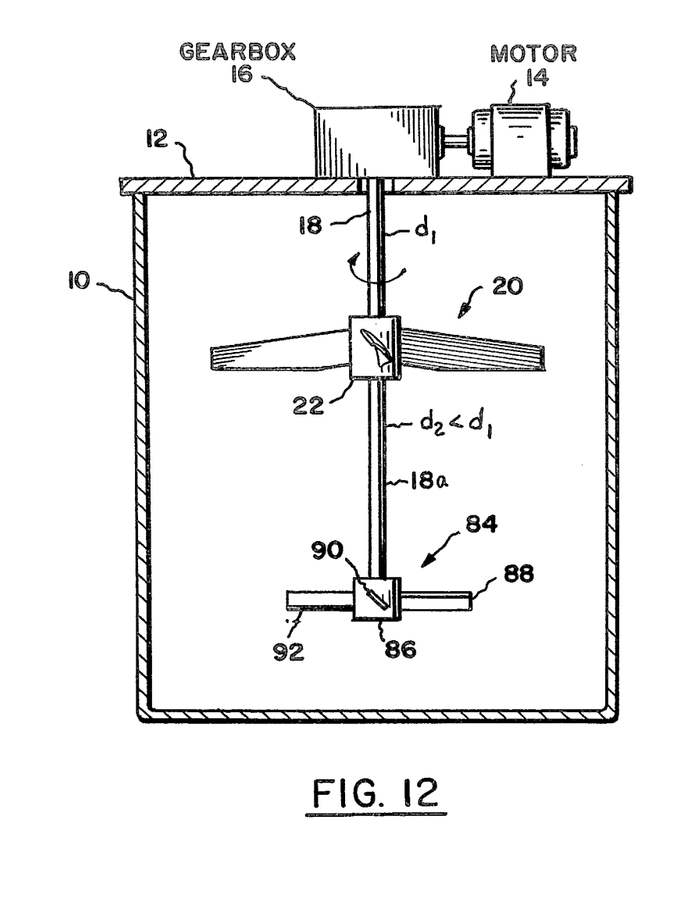
FIG. 12 is a sectional view in elevation of mixing apparatus incorporating an axial flow impeller as illustrated in FIGS. 1 through 6 and 8 and a shear flow impeller, both mounted on a common shaft and rotated by a common drive system.

FIG. 12 shows a mixing apparatus similar to the mixing apparatus shown in FIG. 1, and like parts are labelled with like reference numerals. There is an extension of shaft 18 (shaft extension 18a) which may be of smaller diameter than shaft 18 and which supports a shear flow impeller 84. This impeller has a hub 86 and a plurality of blades, for example, three blades 88, 90 and 92, which are flat blades, each disposed at an angle of 45° to a plane perpendicular to the axis of rotation (the axis of the shaft 18 and shaft extension 18a). By virtue of its flat blades and high pitch angle, the impeller 84 is operated beyond separation or stalling and provides high shear. The diameter of the impeller 84 may be less than half the diameter of the impeller 20, such that only 15% of the power applied to the impellers goes to the shear flow impeller 84. High efficiency axial flow is obtained by the large impeller 20, which is of a design described in connection with FIGS. 1 through 8. Shear and turbulence for certain chemical mixing operations (e.g., emulsification) is provided by the shear flow impeller 84. Also the shear flow impeller 84 is effective in drawdown when the tank is drained to continue mixing during drawdown and emptying of the tank.

From the foregoing description, it will be apparent that there has been provided improved mixing apparatus and particularly improved impellers for use in mixing of liquids and liquid suspensions. Variation and modifications in the herein described apparatus, within the scope of the invention, will undoubtedly suggest themselves to those skilled in the art. Accordingly, the foregoing description should be taken as illustrative and not in a limiting sense.

I claim:

1. For use in mixing a liquid or a liquid suspension medium contained in a vessel, impeller apparatus which comprises an impeller, a shaft having an axis mounting said impeller in said vessel below the level of said medium, a plurality of blades mounted on said shaft for rotation about said axis, each of said blades being formed of a plate of constant thickness except for rounded profile along its leading edge in the direction of flow of the medium and a camber which decreases from the tip of the blade at its outer end to a region adjacent to the base of said blade, each blade also having a geometric pitch angle which increases from the tip to the base thereof and which is at the threshold for flow separation from the surface of said blade along the width thereof from the leading to the trailing edge thereof, such that maximum flow in the direction axially of said shaft is obtained before the onset of said separation.

2. The impeller apparatus according to claim 1 wherein said geometric pitch angle defines a generally constant angle of attack in a direction radially of said shaft axis along said blade.

3. The impeller apparatus according to claim 1 wherein said camber is such that a section through said blade perpendicular to a diameter line extending through said shaft at 0.7 D, where D is measured along said diameter to a point intersected by the tip of said blade, is approximately 4% to 8%.

4. The impeller apparatus according to claim 1 wherein the thickness of said blade is about 6% to 10% of the chord thereof in said section at 0.7 D.

5. The impeller apparatus according to claim 4 wherein said camber is 0° in said region.

6. The impeller apparatus according to claim 5 including a hub on said shaft, bracket means having an ear for each of said blades disposed of said geometric pitch angle for said blade region, and fastening means between said ears and said blade regions for holding said blades on said hubs.

7. The impeller apparatus according to claim 5 wherein said camber varies from about 8% at the tip to 0% in said base region of each of said blades.

8. The impeller apparatus according to claim 1 wherein each of said blades has a planform which is rectilinear with five sides, as shown in FIG. 8.

9. The impeller apparatus as set forth in claim 1 wherein each of said blades is mounted on said shaft, such that a line through the intersection of said tip at about the mid-point of the leading edge is along a diameter through said shaft, and a section along a perpendicular to said diameter at a point 0.7 D, where D is twice the distance along said diameter to said intersection from said shaft axis, intersects said diameter at a point from the leading edge one-quarter the length of said chord to define thereat a load point where the center of forces on said blade is located.

10. The impeller apparatus as set forth in claim 9 wherein said leading edge defines an angle of about 11.7° with said diameter through said intersection.

11. The impeller apparatus according to claim 9 wherein said leading edge is swept back from said base to said tip, such that said load pooint is at said one-quarter point in said section at 0.7 D.

12. The impeller apparatus according to claim 11 wherein the trailing edge of each of said blades, at least in a portion thereof from said tip to said base region, is in a plane perpendicular to said shaft axis such that said blades leave said medium at about the same time as said medium is drained from said tank.

13. The impeller apparatus as set forth in claim 12 wherein said portion of said trailing edge extends to a point which is about 0.4 D from said shaft axis measured along a diameter through said shaft axis.

14. The impeller apparatus as set forth in claim 13 wherein said trailing edge is swept back from said 0.4 D point in a direction towards the hub edge to be parallel thereto.

15. The impeller apparatus as set forth in claim 12 further comprises flow stabilizer means attached to said impeller and extending at least to the plane in which said trailing edge is disposed.

16. The impeller apparatus according to claim 15 wherein said stabilizer means comprises a plurality of fins attached to the tips of said blades and havng upper, side and bottom edges with an upper edge profile above and conforming approximately to the profile of said tip and a rectilinear profile along the side and bottom edges of said fin.

17. The impeller apparatus as set forth in claim 12 further comprising stabilizer means comprising a cylindrical tube having a diameter approximately 0.4 D, wherein D is the diameter encompassed by the tips of said impeller blades, said tube being attached to said base region below said trailing edge co-axially with the axis of said shaft.

18. The impeller apparatus according to claim 1 wherein said geometric pitch angle is such that at the tip of said blades said geometric pitch angle is in a range from about 12° to 32°.

19. The impeller apparatus according to claim 18 wherein the diameter of said impeller measured as twice the radius from the tip to the axis of said shaft and a plane perpendicular to said shaft axis is about sixteen inches and said geometric pitch angle at said tip is about 22°.

20. The impeller apparatus as set forth in claim 18 or claim 19 wherein said geometric pitch angle varies about 16° along each of said blades from the tip to the base thereof.

21. The impeller apparatus as set forth in claim 20 wherein said impeller has at least three blades.

22. The impeller apparatus as set forth in claim 1 wherein said vessel is a tank and said impeller is mounted on said shaft such that it is located with the ratio C/D, where C is the distance along said shaft to said impeller from the bottom of said tank to said impeller and D is the diameter of said impeller along a circle encompassed by the tip of said blades is between 1.67 and 4.

23. The impeller apparatus according to claim 22 further comprising said shaft being of such length as to extend below said impeller and another impeller on said shaft below said first named impeller having a plurality of blades, each disposed of a geometric pitch angle beyond the angle for separation of flow in said medium whereby to impart shear forces in a radial direction in said medium.

* * * * *